(12) United States Patent  (10) Patent No.: US 8,344,249 B1
Baldwin et al.  (45) Date of Patent: Jan. 1, 2013

(54) PROVISIONS FOR SECUREMENT OF AN ELECTRICAL BOX

(75) Inventors: Jeffrey P. Baldwin, Phoenix, AZ (US); Marcus J. Shotey, Scottsdale, AZ (US); Thomas A. Miserendino, Gilbert, AZ (US)

(73) Assignee: Hubbell Incorporated, Shelton, CT (US)

( * ) Notice: Subject to any disclaimer, the term of this patent is extended or adjusted under 35 U.S.C. 154(b) by 278 days.

(21) Appl. No.: 12/897,285

(22) Filed: Oct. 4, 2010

Related U.S. Application Data

(63) Continuation-in-part of application No. 12/533,016, filed on Jul. 31, 2009.

(60) Provisional application No. 61/248,284, filed on Oct. 2, 2009.

(51) Int. Cl.
*H05K 5/00* (2006.01)

(52) U.S. Cl. ............. 174/50; 174/58; 439/535; 248/906

(58) Field of Classification Search ............ 174/50, 174/58, 17 R; 248/906; 439/535; 220/4.02; 361/600
See application file for complete search history.

(56) References Cited

U.S. PATENT DOCUMENTS

| | | |
|---|---|---|
| 2,425,545 A | 8/1947 | Lefebre |
| 2,458,153 A | 1/1949 | Festge |
| 2,606,586 A | 8/1952 | Hill |
| 2,757,817 A | 4/1954 | Egan |
| 2,875,915 A | 3/1959 | Buckels |
| 2,916,733 A | 12/1959 | Hirsch |
| 3,449,706 A | 6/1969 | Carissimi |
| 3,952,908 A | 4/1976 | Carson |
| 4,063,660 A | 12/1977 | Ware |
| 4,135,337 A * | 1/1979 | Medlin .................. 220/3.3 |
| 4,307,264 A | 12/1981 | Hess |
| 4,335,271 A | 6/1982 | Haslbeck |
| 4,365,108 A | 12/1982 | Bright |
| 4,634,015 A | 1/1987 | Taylor |
| 4,803,307 A | 2/1989 | Shotey |
| 4,925,045 A | 5/1990 | Logsdon |
| 4,988,832 A | 1/1991 | Shotey |
| 5,042,673 A | 8/1991 | McShane |
| 5,072,911 A | 12/1991 | Logsdon |
| 5,142,102 A | 8/1992 | Michie |
| 5,289,934 A | 3/1994 | Smith et al. |
| 5,527,993 A | 6/1996 | Shotey et al. |
| 5,562,222 A | 10/1996 | Jordan et al. |
| 5,668,350 A | 9/1997 | Yanase |
| 5,763,831 A | 6/1998 | Shotey et al. |
| 5,773,760 A | 6/1998 | Stark et al. |
| 5,833,110 A | 11/1998 | Chandler et al. |
| 5,931,325 A | 8/1999 | Filipov |
| 6,084,395 A | 7/2000 | Thiel |
| 6,133,531 A | 10/2000 | Hayduke et al. |

(Continued)

*Primary Examiner* — Dhirubhai R Patel
(74) *Attorney, Agent, or Firm* — Booth Udall, PLC

(57) ABSTRACT

An electrical box including at least four sides extending from a bottom to an open top and a front surface, a first outer tab extending from one of the at least four sides and proximate the front surface, a second outer tab extending from one of the at least four sides opposite the first outer tab and proximate the front surface, a first aperture adjacent the first outer tab, a second aperture adjacent the second outer tab, a first locking tab mounted within the first aperture, a second locking tab mounted within the second aperture, and wherein the first and second locking tabs slide towards the front surface for securing a mounting wall between the first outer tab and the first locking tab and between the second outer tab and the second locking tab.

19 Claims, 4 Drawing Sheets

U.S. PATENT DOCUMENTS

| | | | |
|---|---|---|---|
| 6,198,045 B1 | 3/2001 | Roesch | |
| 6,441,307 B1 | 8/2002 | Shotey et al. | |
| 6,476,321 B1 | 11/2002 | Shotey et al. | |
| 6,723,922 B1 | 4/2004 | Shotey et al. | |
| 6,737,576 B1 | 5/2004 | Dinh | |
| 6,761,582 B1 | 7/2004 | Shotey et al. | |
| 6,770,816 B2 | 8/2004 | Shotey et al. | |
| 6,774,307 B2 | 8/2004 | Kruse et al. | |
| 6,820,760 B2 | 11/2004 | Wegner et al. | |
| 6,894,223 B1 | 5/2005 | Shotey et al. | |
| 6,914,187 B2 | 7/2005 | Hull et al. | |
| 6,955,559 B2 | 10/2005 | Pyrros | |
| 6,956,168 B2 * | 10/2005 | Herth | 174/53 |
| 6,979,777 B2 | 12/2005 | Marcou et al. | |
| 6,987,225 B2 | 1/2006 | Shotey et al. | |
| 7,038,131 B1 | 5/2006 | Gretz | |
| 7,098,399 B1 | 8/2006 | Gretz et al. | |
| 7,109,419 B1 | 9/2006 | Gretz | |
| 7,259,328 B1 | 8/2007 | Gretz | |
| 7,374,058 B2 | 5/2008 | Dinh et al. | |
| 7,378,590 B1 * | 5/2008 | Herth | 174/50 |
| 7,488,891 B1 * | 2/2009 | Gretz | 174/58 |
| 7,816,604 B1 * | 10/2010 | Gretz | 174/58 |
| 2005/0197019 A1 | 9/2005 | Gretz et al. | |

* cited by examiner

PROVISIONS FOR SECUREMENT OF AN ELECTRICAL BOX

CROSS REFERENCE TO RELATED APPLICATIONS

This application is a continuation-in-part of U.S. application Ser. No. 12/553,016 entitled "RETROFIT OUTLET ELECTRICAL BOX" to Shotey et al. which was filed on Sep. 2, 2009, the contents of which are hereby incorporated herein by reference. This application also claims the benefit of the filing date of U.S. Provisional Patent Application 61/248,284 entitled "PROVISIONS FOR SECUREMENT OF AN ELECTRICAL BOX" to Shotey et al. which was filed on Oct. 2, 2009, the contents of which are hereby incorporated herein by reference.

BACKGROUND

1. Technical Field

Aspects of this document relate generally to electrical boxes and particularly "old" electrical boxes.

2. Background Art

Electrical boxes are manufactured in a variety of shapes and sizes. Electrical boxes may include one, two, three, or more gangs, each arranged to receive an electrical device. Such conventional electrical boxes typically consist of a generally box-shaped structure that is mounted to a wall stud or other interior wall structure via one or more nails, screws, or other fastening devices. An electrical box is typically a one-piece structure and contains an opening for an electrical device or connector which is typically installed within the box after the box is mounted within a wall. Once the structure is completed and drywall or plaster has been installed, it is much more difficult to install a traditional electrical box. For instance, a very large hole must be cut in the drywall so that the installer can use a hammer to mount the electrical box to the structure. An alternative is the use of an "old" electrical box that mounts to the drywall. Specifically, the "old" style electrical box uses opposing tabs located on each side of the drywall that are clamped together to secure the electrical box to the wall.

SUMMARY

Aspects of this document relate to electrical boxes. In one aspect, an electrical box includes at least four sides extending from a bottom to an open top and a front surface, a first outer tab extending from one of the at least four sides and proximate the front surface, a second outer tab extending from one of the at least four sides opposite the first outer tab and proximate the front surface, a first aperture adjacent the first outer tab, a second aperture adjacent the second outer tab, a first locking tab mounted within the first aperture, a second locking tab mounted within the second aperture, and wherein the first and second locking tabs slide towards the front surface for securing a mounting wall between the first outer tab and the first locking tab and between the second outer tab and the second locking tab.

Particular implementations may comprise one or more of the following features. The first and second apertures may further include a track and wherein the first and second locking tabs communicate with the track. The track may further include a plurality of teeth. The first and second locking tabs may each include a plurality of teeth communicating with the plurality of track teeth. The first and second locking tabs may each further include an opening in a bottom portion. An installer may manipulate the locking tabs from within the open top.

The installer may manipulate the locking tabs from within the locking tab opening. The first and second locking tabs may further include a locking wall spaced from each respective locking tab, and wherein the locking wall contacts the mounting wall. The first locking tab may be spring biased towards the first outer tab and the second locking tab may be spring biased towards the second outer tab. The first locking tab may extend above the first outer tab and the second locking tab may extend above the second outer tab.

The electrical box may further include a third outer tab located on a common side with the first outer tab and a fourth outer tab located on a common side with the second outer tab. The plurality of track teeth may be located on an outer surface of the track. The first and second locking tabs may be removable from the first and second apertures. The first and second apertures may receive electrical wire therein. The track may be integral with the electrical box.

In another aspect, a method of installing an electrical box includes the steps of providing an electrical box including at least four sides extending from a bottom to an open top and a front surface, a first outer tab extending from one of the at least four sides and proximate the front surface, a second outer tab extending from one of the at least four sides and proximate the front surface, a first aperture adjacent the first outer tab, a second aperture adjacent the second outer tab, a first locking tab, and a second locking tab, locating the first locking tab partially within the first aperture, locating the second locking tab partially within the second aperture, inserting the electrical box within a mounting wall until the first and second outer tabs contact the mounting wall, and moving the first and second locking tabs into contact with the mounting wall.

In particular implementations, the method may include the step of pushing the first locking tab through the first aperture and the second locking tab through the second aperture after inserting the electrical box within the mounting wall. The method may include the step of engaging the first and second locking tabs with a track in the first and second apertures. The step of moving the first and second locking tabs may further include the step of an installer inserting a finger into an opening in the locking tab to manipulate the locking tab. The method may include the step of engaging the first and second locking tabs with a plurality of teeth in the first and second apertures.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present disclosure will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation and assembly procedures for an electrical box will become apparent for use with implementations of an electrical box from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical box.

Figure 1:
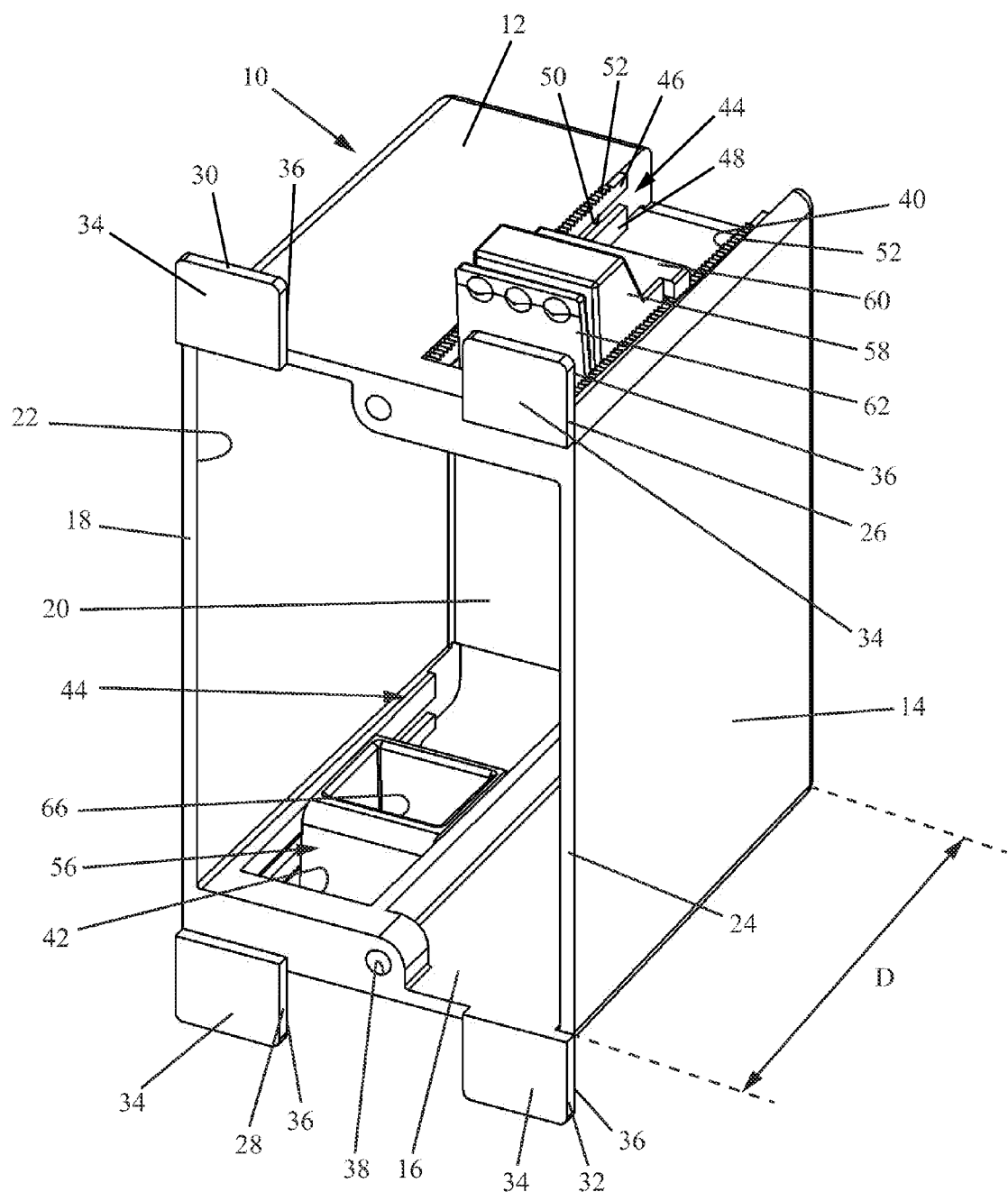
FIG. 1 is a front perspective view of an electrical box with locking tabs.

FIG. 1 illustrates an electrical box 10 having a top wall 12, a right wall 14, a lower wall 16, a left wall 18, and a bottom wall 20 together defining a cavity 22. Cavity 22 extends forward towards the open top and terminates at a front surface 24 of electrical box 10. The electrical box includes a first outer tab 26, a second outer tab 28, a third outer tab 30, and a fourth outer tab 32. Each of the outer tabs 26-32 includes a front surface 34 and a rear surface 36. A pair of device mounting holes 38 may be located in top wall 12 and lower wall 16 and may be threaded to secure an electrical device within the electrical box.

Electrical box 10 may also include a first aperture 40 and a second aperture 42 each arranged to receive electrical wiring therein. First aperture 40 is preferably formed in top wall 12, while second aperture 42 is located in lower wall 16 and both apertures extend just less than the depth D of the electrical box. Apertures 40 and 42 each include a track 44 that may be integral with the electrical box and on both sides of each aperture. Track 44 may include an upper rail 46 and a lower rail 48, with a slot 50 between the rails. A plurality of teeth 52 may extend outward from upper rail 46 and are arrange to mate with the locking tab as discussed in greater detail below.

Figure 2:
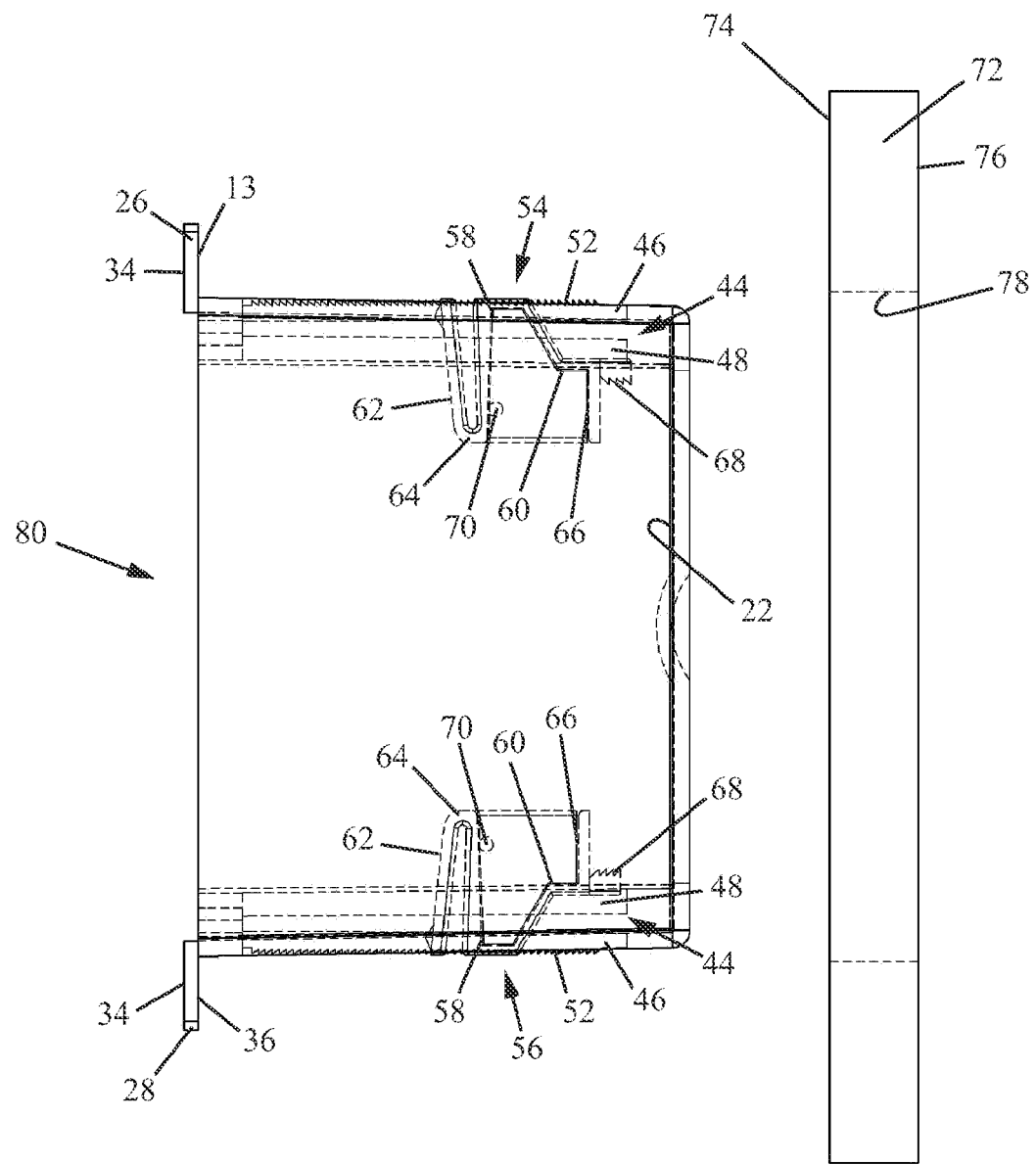
FIG. 2 is a right side view of an electrical box prior to installation within a mounting wall.

Referring to FIGS. 1 and 2, electrical box 10 also includes a first locking tab 54 slidably located in first aperture 40 and a second locking tab 56 slidably located in second aperture 42. Each locking tab includes a body 58 with a tail portion 60 and a locking wall 62 spaced forward of body 58 by a connector 64. Body 58 and tail portion 60 at least partially define an opening 66 in a bottom portion of each locking tab. Further, tail portion 60 includes a plurality of teeth 68 arranged to communicate with plurality of track teeth 52. Finally, locking tabs 54 and 56 each include alignment guides 70 communicating with track 44 and particularly within slot 50 when the locking tabs extend above the respective outer tabs.

Figure 3:
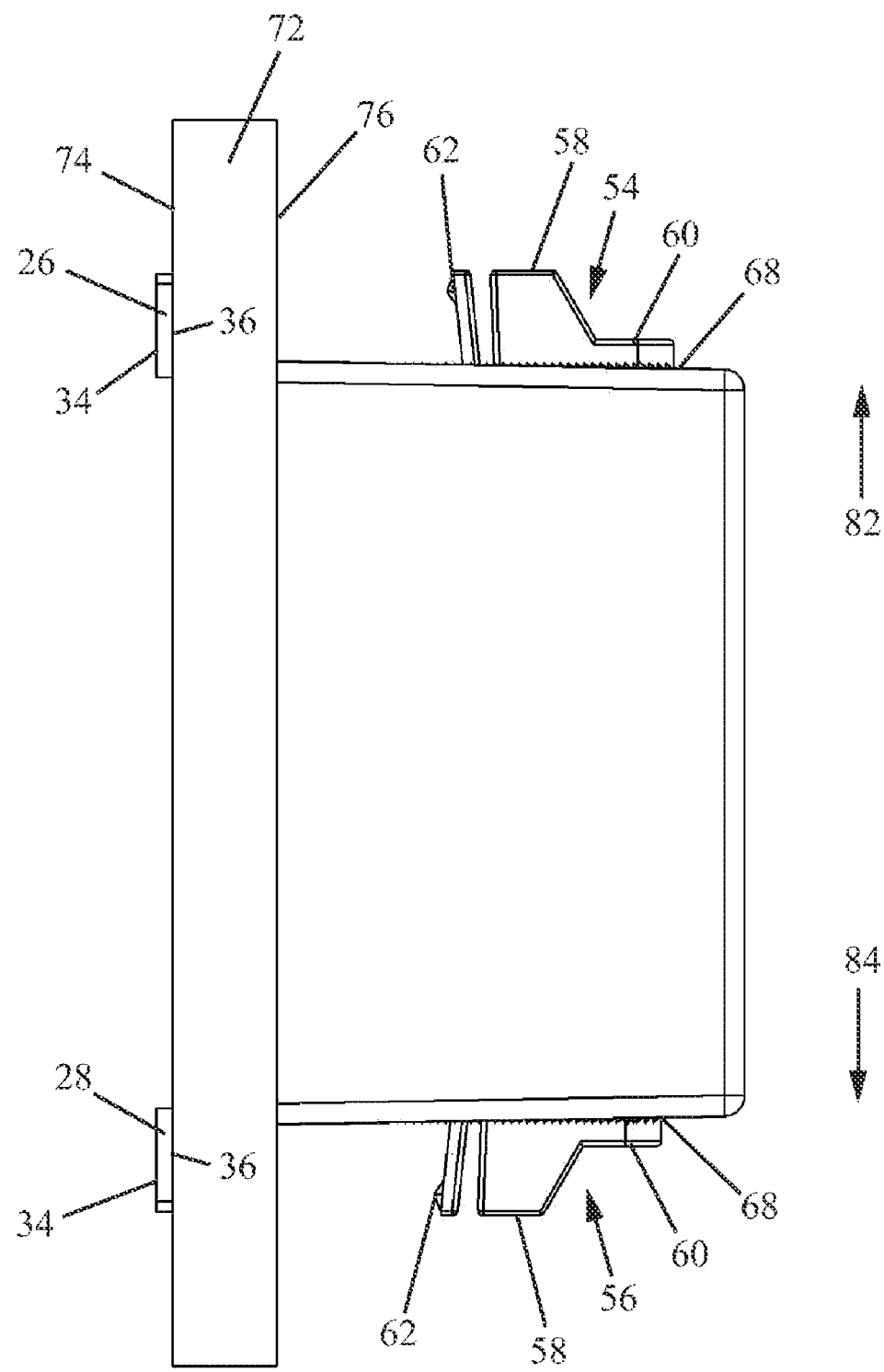
FIG. 3 is a right side view of an electrical box partially installed within a mounting wall prior to securing the locking tabs; and, FIG. 4 is a right side view of an electrical box installed within the mounting wall.
Figure 4:
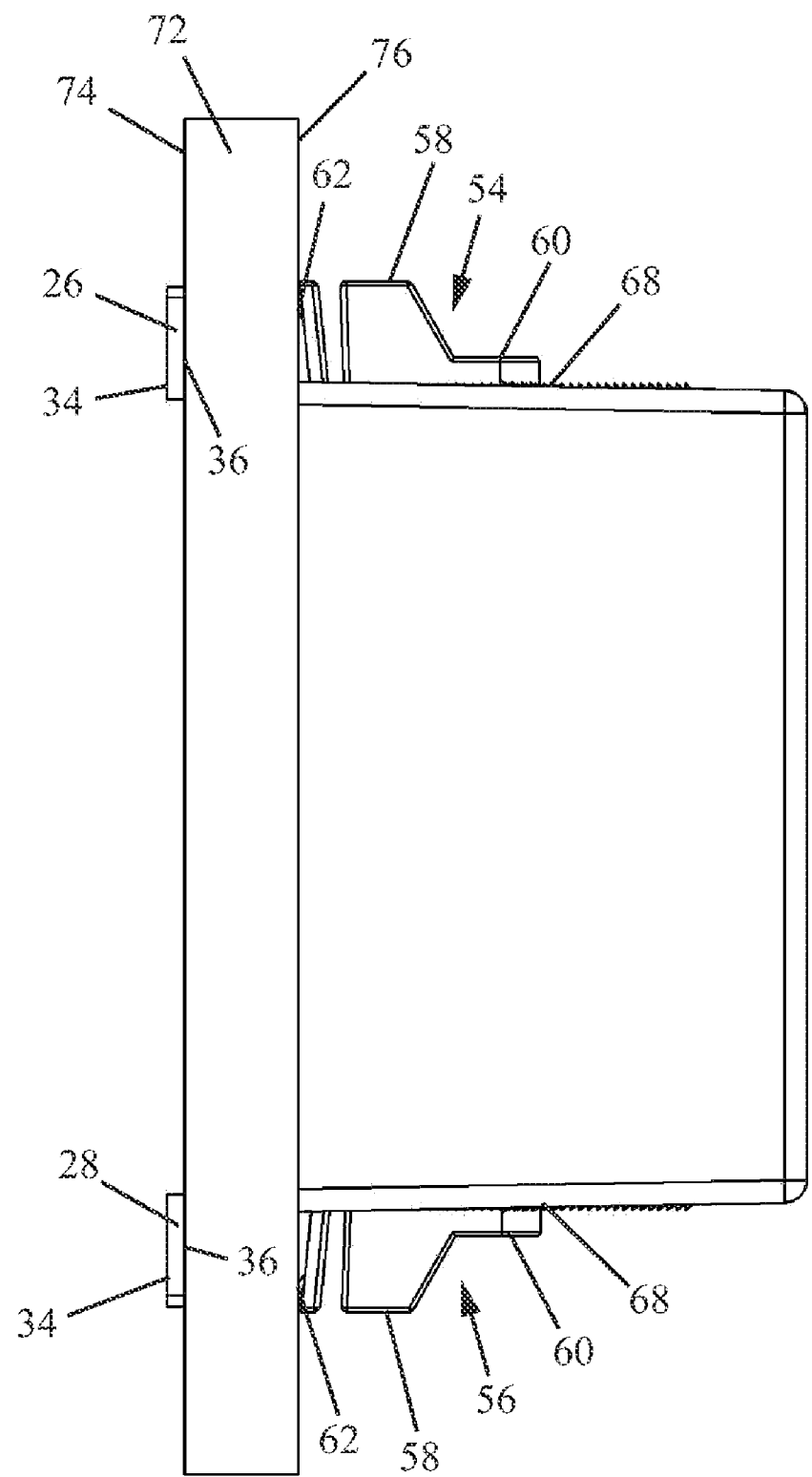

FIGS. 2 through 4 illustrate the installation of electrical box 10. FIG. 2 shows electrical box 10 near mounting wall 72, which has a front surface 74, a rear surface 76, and a box receiving opening 78 cut therein. In this position, first locking tab 54 and second locking tab 56 are each located within cavity 22 as the electrical box is installed in the direction associated with arrow 80.

FIG. 3 illustrates the first locking tab 54 and second locking tab 56 pushed outward beyond outer tabs 26 and 28 by an installer manipulating the locking tabs from within the open top and through opening 66 in each locking tab. Specifically, the installer may force locking tab 54 in the direction associated with arrow 82 and force locking tab 56 in the direction associated with arrow 84 until each alignment guide 70 is located securely within the respective track 44. When the alignment guides 70 are properly located within track 44, the installer may manipulate the locking tabs from within the electrical box through openings 66 to pull the locking tabs forward.

As seen in FIG. 4, the installer has pulled locking tabs 54 and 56 forward until locking walls 62 securely contact rear surface 76 of mounting wall 72. Further, the tension forces contact with rear surface 36 of tabs 26-32, thereby securely locating mounting wall 72 between the four mounting tabs and locking walls 62 of locking tabs 54 and 56. In addition, the communication between the plurality of track teeth 52 with the plurality of locking tab teeth 68 insure that the positions of the locking tabs remains consistent until the installer moves the respective locking tab.

In operation, the installer cuts an opening in the mounting wall so that the outer tabs will contact the front surface of the mounting wall and the locking wall of the locking tabs will contact the rear surface of the mounting wall. The locking tabs are either already located within their respective apertures or may be inserted partially within the apertures. The installer then forces each locking tab through each aperture to place the locking tab in position to contact the mounting wall. The installer then pulls the locking tabs forward from within the electrical box until the locking tabs and outer tabs surround the mounting wall and securely hold the electrical box in position. When the installer forces the locking tabs within the apertures, the alignment guides are preferably aligned within the slots of the track. The locking tabs are then retained in their position in part due to the help of the engagement between the plurality of track teeth and the plurality of locking tab teeth.

It will be understood that implementations are not limited to the specific components disclosed herein, as virtually any components consistent with the intended operation of a method and/or system implementation for an electrical box may be utilized. Accordingly, for example, it should be understood that, while the drawing figures and accompanying text show and describe a generally rectangular electrical box, an electrical box of the present disclosure may contain any number of sides. Common electrical box shapes also include round, square, and octagonal. While the aspects and implementations have been described with only two locking tabs, any suitable number of locking tabs may be utilized, including but not limited to one or four. Further, the implementations utilized four outer tabs, however any suitable number may be incorporated. Components may comprise any shape, size, style, type, model, version, class, grade, measurement, concentration, material, weight, quantity, and/or the like consistent with the intended operation of a method and/or system implementation for an electrical box.

The concepts disclosed herein are not limited to the specific implementations shown herein. For example, it is specifically contemplated that the components included in a particular implementation of an electrical box may be formed of any of many different types of materials or combinations that can readily be formed into shaped objects and that are consistent with the intended operation of an electrical box. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the electrical box may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical box, it should be readily apparent that a number of modifications may be made without departing from the spirit thereof and that these implementations may be applied to other electrical boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. An electrical box comprising:
   at least four sides extending from a bottom to an open top and a front surface;
   a first outer tab extending from one of the at least four sides and proximate the front surface;
   a second outer tab extending from one of the at least four sides opposite the first outer tab and proximate the front surface;
   a first aperture adjacent the first outer tab;
   a second aperture adjacent the second outer tab;
   a first locking tab slidably mounted to a first track at the first aperture;
   a second locking tab slidably mounted to a second track at the second aperture; and,
   wherein the first and second locking tabs slide towards the front surface coupled to the respective first or second track for securing a mounting wall between the first outer tab and the first locking tab and between the second outer tab and the second locking tab.

2. The electrical box of claim 1 wherein each of the tracks further comprises a plurality of track teeth.

3. The electrical box of claim 2 wherein the first and second locking tabs each further comprise a plurality of tab teeth communicating with the plurality of track teeth of the respective first or second track.

4. The electrical box of claim 2 wherein the plurality of track teeth are located on an outer surface of the respective tracks.

5. The electrical box of claim 1 wherein the first and second locking tabs each further comprise an opening in a bottom portion.

6. The electrical box of claim 5 wherein an installer manipulates the locking tabs from within the open top.

7. The electrical box of claim 5 wherein an installer manipulates the respective locking tabs from within the respective locking tab opening.

8. The electrical box of claim 1 wherein the first and second locking tabs further comprise a locking wall spaced from each respective locking tab, and wherein when the first and second locking tabs slide towards the front surface, the locking wall contacts the mounting wall.

9. The electrical box of claim 1 wherein the first locking tab is spring biased towards the first outer tab and the second locking tab is spring biased towards the second outer tab.

10. The electrical box of claim 1 wherein the first locking tab extends above the first outer tab and the second locking tab extends above the second outer tab.

11. The electrical box of claim 1 further comprising a third outer tab located on a common side with the first outer tab and a fourth outer tab located on a common side with the second outer tab.

12. The electrical box of claim 1 wherein the first and second locking tabs are removable from the first and second apertures.

13. The electrical box of claim 1 wherein the first and second apertures are sized to receive electrical wire therein.

14. The electrical box of claim 1 wherein the track is integral with the electrical box.

15. A method of installing an electrical box comprising the steps of:
   providing an electrical box including:
     at least four sides extending from a bottom to an open top and a front surface;
     a first outer tab extending from one of the at least four sides and proximate the front surface;
     a second outer tab extending from one of the at least four sides and proximate the front surface;
     a first aperture adjacent the first outer tab;
     a second aperture adjacent the second outer tab;
     a first locking tab; and,
     a second locking tab;
   locating the first locking tab partially within the first aperture on a first track;
   locating the second locking tab partially within the second aperture on a second track;
   inserting the electrical box within a mounting wall until the first and second outer tabs contact the mounting wall; and,
   moving the first and second locking tabs into contact with the mounting wall along the respective first or second track.

16. The method of claim 15 further comprising the step of pushing the first locking tab through the first aperture and the second locking tab through the second aperture after inserting the electrical box within the mounting wall.

17. The method of claim 15 further comprising the step of engaging the first and second locking tabs with the respective track in the first and second apertures.

18. The method of claim 15 wherein the step of moving the first and second locking tabs further comprises the step of an installer inserting a finger into an opening in each of the respective locking tabs to manipulate the respective locking tab.

19. The method of claim 15 further comprising the step of engaging the first and second locking tabs with a plurality of teeth in the first and second apertures.

* * * * *